UNITED STATES PATENT OFFICE 1,942,769

FLY ASH STRUCTURAL MATERIAL

Harry C. Peffer and Paul W. Jones, La Fayette, Ind., assignors to Rostone, Incorporated, La Fayette, Ind., a corporation of Indiana No Drawing. Application October 30, 1931
Serial No. 572,214

18 Claims. (Cl. 18—47.5)

Our invention is a novel method of making structural material utilizing the mineral refuse produced in the burning of powdered bituminous coal and technically known as "fly ash", and the product of such method; such material having valuable structural qualities such as possessing a high degree of strength, resistance to abrasion and other valuable qualities.

When bituminous coal is burned in the usual manner on a grate or stoker, the mineral matter of the coal is partially and imperfectly fused into a lumpy more or less porous mass, enclosing unfused mineral material, coke, unburned coal, etc., usually designated as ashes or clinker. Such material differs from fly ash, not only in its physical form and contained impurities, but in being a product of partial fusion only.

Powdered or pulverized bituminous coal is now extensively used in large power plants, due to its high combustion rate, ease of control and high efficiencies obtainable. The coal is reduced to a fineness of 100-200 mesh per inch and blown into the furnace by a blast of air, being consumed directly, and the mineral refuse in the form of minute globules or bubbles of microscopic dimension (usually less than seven one thousandths millimeter in diameter) is carried off in the stream of combustion gases passing through the furnace, and on account of their state of minute subdivision are not deposited in the flues and are discharged with the waste gases and are ultimately precipitated on the surrounding regions to such an extent as to constitute a nuisance. It is to be noted that due to its extreme fineness and lightness, this material does not lend itself to filling waste ground, as in the case of ordinary ashes, but is carried away by winds to other parts of the neighborhood.

The material above described is technically described as "fly ash" and so referred to hereinafter in this specification.

The aforesaid "fly ash" differs physically and chemically from ash produced by ordinary combustion processes. The fly ash from a certain central bituminous coal showed by analysis,— 45.1% silica, 21.34% alumina, 15.08% $Fe_2O_3$, 3.16% FeO, 6.85% CaO. It is to be noted that fly ash differs from all other forms of refuse from coal in its extreme state of subdivision and the form of its particles; also due to its being a fusion product, its chemical and mineralogical composition is different. Also, it is to be noted that due to the immense surface resulting from its extremely fine state of subdivision, its reactivity is greatly increased as compared with ordinary combustion refuse. Some carbon, may be present on the individual particles, in quantities up to 6%, and is easily removed if it is desired to do so.

This fly ash however is exceedingly objectionable because it is so very fine that it is practically impossible to exclude it from buildings, and it is injurious to health and also injurious to vegetation.

As above shown this so-called "fly ash" is a very different thing from the ordinary ashes clinker obtained from burning fuel on a grate; and its principal component is not unburned carbon; but fusion products of silica, aluminum oxide and iron oxide.

We have discovered that this "fly ash" can be converted into a stone-like material having valuable structural qualities, by the following method:—

The "fly ash" can be precipitated or collected, usually in a dry condition, in the stacks or at the outlet of the furnaces by any suitable means, and stored for use. As the fly ash normally occurs in a state of minute subdivision, regrinding is unnecessary.

Where it is desirable to remove the carbon and objectionable amounts of sulphur, the fly ash is reburned or calcined in a rotary kiln, in presence of excess air or in other appropriate type of roasting furnace. The temperature and likewise time of roasting determine in considerable measure, the color of the product.

The dry fly ash as collected may contain soluble sulphates of potassium, sodium, calcium and magnesium, (together with some free lime) in quantities sufficient to cause efflorescence. In order to remove the soluble efflorescence producing salts and to slake certain components which cause unsoundness in the finished product, the following treatment is resorted to:

The dry fly ash is mixed and incorporated in a wet pan or a substitute therefor with sufficient water to thoroughly moisten the mass, which is then made up into a slurry, with water and the slurry may be heated, preferably by injecting steam. The excess water by means of which washing has been effected, is removed by means of a filter, centrifuge or other appropriate means, washing being effected at the same time. The step of filtration or similar step is merely for the purpose of removing excess water carrying the soluble materials.

The purpose of heating the slurry is to remove the water soluble salts which cause "efflorescence", i. e. a white scale on the finished product; and to initiate the slaking of the mass to prevent subsequent swelling or disintegration of the product.

If wet scrubbing has been employed, treatment in the wet pan is unnecessary.

The moist mass from the filter is allowed to age or stand for one or more days. The step of aging is for the purpose of facilitating the slaking of the fly ash before the addition of the alkaline earth base. At the end of this period a portion of the mass, in proportion determined by trial and depending on the individual characteristics of the ash, may be passed through a closed chamber and exposed to steam at 212° F.

Steaming of the filtered mass is done for two reasons: (1) to reduce the water in excess of that necessary to produce sound structure, and (2) to prevent fine cracking in the final product.

We have found that steaming the filter cake reduces the excess water and obivates cracking in the product, but if the whole filtered mass is steamed, the strength, hardness and porosity of the product are affected.

If steaming at 212° F. does not sufficiently eliminate excess water the steamed portion may be passed through a drier. It is necessary to successful operation that the unsteamed portion of the filter cake be not subjected to heat until the final induration. However, by resteaming a portion of the filtered mass (the aliquot being determined by test, and differing for different materials), a sound structure is obtained. Should this treatment fail to remove sufficient water to bring the average of the total mass down to proper working consistency, all, or a portion is passed through a drier, mixed and thoroughly incorporated with the untreated portion and with the lime necessary for the hardening reaction. The lime necessary for the production of our material is preferably in the form of calcium hydrate and is added substantially in the proportion of 10%–15% based on the weight of dry fly ash, depending on the chemical composition and other characteristics of the fly ash. Reincorporation is effected in a wet pan, or other convenient means, to produce intimate and thorough admixture of the components.

The incorporated mass is then formed into desired shapes, preferably by suitable mechanical means. These shapes without drying are then indurated, by heating same (preferably in presence of water vapor), while retaining the essential re-acting water therein, until the desired chemical reaction occurs. Steam may be used for this purpose, and may be brought from an outside source, or generated within the vessel in which the shapes are placed until the reaction occurs.

With the fly ash we have been using by starting the heating of the shaped mass at 212° F. and gradually raising it during a period of one to four hours, and completing the heating at about 300° F., complete reaction is brought about, as evidenced by the absence of free lime in the product. The resulting product is a stone-like material very finely grained, readily workable, and having a compressive strength of about eight thousand pounds per square inch. Higher temperatures may be employed, but have not been found necessary. However, as fly ash from various sources differs in composition, we do not limit ourselves, either in the matter of time or temperature, but use the above merely by way of illustration. Complete reaction between the fly ash and the alkaline earth base is evidenced by the absence of free lime in the final product, and the formation of a stone-like material, fine grained and readily workable with a compressive strength of about eight thousand pounds per square inch.

The product can be produced in various colors if desired by adding to the mass, prior to the shaping thereof, a suitable mineral pigment; and when properly colored it will retain its color permanently. For large heavy bodies of material the outer portion of the material need only be colored. This can be easily done by partly filling the mold with the uncolored material, and completing the filling thereof with material of the desired color. Likewise the physical structure of the product may be changed and altered by the addition to the original mixture of aggregates of different size and colors.

We claim:—

1. The herein described process of producing an artificial structural material; consisting in reburning fly ash produced by burning finely divided coal of the bituminous class, slaking the reburned fly ash, mixing the slaked fly ash with an alkaline earth base, shaping the mass and indurating the shaped mass.

2. The herein described process of making an artificial structural material; consisting in reburning fly ash produced by burning finely divided bituminous coal, slaking the reburned fly ash, mixing the slaked fly ash with an alkaline earth base and sufficient water to render the same workable, shaping the mass, and heating the shaped mass in the presence of water vapor until the mass is transformed into said material.

3. The herein described process of producing an artificial structural material; consisting in washing fly ash produced by burning finely divided coal of the bituminous class, mixing the washed fly ash with an alkaline earth base, shaping the mass and indurating the shaped mass.

4. The herein described process of producing an artificial structural material; consisting in reburning fly ash produced by burning finely divided coal of the bituminous class, washing the reburned fly ash, mixing the washed fly ash with an alkaline earth base, shaping the mass and indurating the shaped mass.

5. The herein described process of making an artificial structural material; consisting in reburning fly ash produced by burning finely divided bituminous coal, washing the reburned fly ash, mixing the washed fly ash with an alkaline earth base and sufficient water to render the same workable, shaping the mass, and heating the shaped mass in the presence of water vapor until the mass is transformed into said material.

6. The herein described process of making an artical structural material; consisting in washing fly ash produced by burning finely divided bituminous coal, mixing the washed fly ash with lime and sufficient water to render the same workable, shaping the mass, and heating the shaped mass while retaining the essential reacting water therein until the mass is transformed into said material.

7. The herein described process of making an artificial structural material; consisting in reburning fly ash produced by burning finely divided bituminous coal, slaking the reburned ash, mixing the slaked ash with lime and sufficient water to render the same workable, shaping the mass, and heating the shaped mass in the presence of water vapor until the mass is transformed into said material.

8. The herein described process of making an artificial structural material; consisting in reburning fly ash produced by burning finely divided bituminous coal, washing the reburned fly ash, mixing the washed fly ash with lime and sufficient water to render the same workable, shaping the mass, and heating the shaped mass in the presence of water vapor until the mass is transformed into said material.

9. The herein described process of producing an artificial structural material; consisting in washing fly ash produced by burning finely divided coal of the bituminous class, removing excess water, aging the mass, mixing the so treated ash with an alkaline earth base, shaping the mass and indurating the shaped mass.

10. The herein described process of producing an artificial structural material; consisting in washing fly ash produced by burning finely divided coal of the bituminous class, removing excess water, aging the mass, steaming the mass, mixing the so treated ash with an alkaline earth base, shaping the mass and indurating the shaped mass.

11. The herein described process of making an artificial structural material; consisting in washing fly ash produced by burning finely divided bituminous coal, removing excess water, aging the mass, steaming the mass, mixing the so treated fly ash with an alkaline earth base and sufficient water to render the same workable, shaping the mass, and heating the shaped mass by moist heat until the mass is transformed into said material.

12. The herein described artificial structural material; produced by washing the fly ash obtained by burning finely divided coal of the bituminous class, mixing the washed fly ash with an alkaline earth base, shaping the mass and indurating the same.

13. The herein described artificial structural material; produced by reburning fly ash obtained by burning finely divided coal of the bituminous class, slaking the reburned ash, mixing the slaked fly ash with an alkaline earth base, shaping the mass and indurating the shaped mass in moist heat.

14. The herein described artificial structural material; produced by reburning fly ash obtained by burning finely divided bituminous coal, slaking the fly ash, mixing the slaked fly ash with an alkaline earth base and sufficient water to render the same plastic, shaping the mass, and heating the shaped mass while retaining the essential reacting water therein until the mass is transformed into said material.

15. The herein described artificial structural material; produced by reburning fly ash obtained by burning finely divided bituminous coal, slaking the reburned fly ash, mixing the slaked fly ash with lime and sufficient water to render the same plastic, shaping the plastic mass, and heating the shaped mass in the presence of water vapor until the mass is transformed into said material.

16. The herein described artificial structural material produced by washing fly ash, removing excess water, mixing the so treated ash with an alkaline earth base, shaping the mass and indurating the shaped mass.

17. The herein described artificial structural material; produced by washing fly ash, removing excess water, aging the mass, steaming the mass, mixing the so treated ash with an alkaline earth base, shaping the mass and indurating the shaped mass.

18. The herein described artificial structural material; produced by washing fly ash, removing excess water, aging the mass, steaming the mass, mixing the so treated fly ash with an alkaline earth base and sufficient water to render the same plastic, shaping the mass, and heating the shaped mass by moist heat until the mass is transformed into said material.

HARRY C. PEFFER.
PAUL W. JONES.